United States Patent [19]

Raue et al.

[11] Patent Number: 4,847,177
[45] Date of Patent: Jul. 11, 1989

[54] FANAL PIGMENTS OF CLOSED-RING DRY TONERS CONTAINING INDAMINE-AND DIPHENYLMETHANE DYESTUFFS

[75] Inventors: Roderich Raue; Hubertus Psaar, both of Leverkusen, Fed. Rep. of Germany

[73] Assignee: Bayer Aktiengesellschaft, Leverkusen, Fed. Rep. of Germany

[21] Appl. No.: 180,402

[22] Filed: Apr. 12, 1988

[30] Foreign Application Priority Data

Apr. 29, 1987 [DE] Fed. Rep. of Germany ....... 3714289

[51] Int. Cl.$^4$ .............................................. G03G 9/08
[52] U.S. Cl. ..................................... 430/106; 430/110
[58] Field of Search ................ 430/110, 106; 524/904; 525/934

[56] References Cited

U.S. PATENT DOCUMENTS 3,985,559 10/1976 Peters .................... 430/106
4,145,300 3/1979 Hendriks ............... 430/110 X
4,238,562 12/1980 Ishida et al. ............ 430/106

FOREIGN PATENT DOCUMENTS 51-98031 8/1976 Japan ................... 430/106
53-29132 3/1978 Japan ................... 430/106
60-195553 10/1985 Japan .................. 430/106

Primary Examiner—Paul R. Michl
Assistant Examiner—Jeffrey A. Lindeman
Attorney, Agent, or Firm—Sprung Horn Kramer & Woods

[57] ABSTRACT

A dry toner for developing latent electrostatic images in electrostatic copying and printing processes contains, as charge-control substance, a pigment of the formula

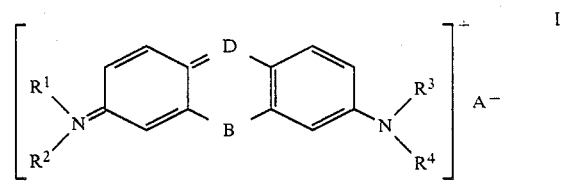

in which
$A^-$ represents a silicomolybdate anion,
$R^1$ and $R^3$ represent, independently of each other, hydrogen, alkyl or aralkyl,
$R^2$ and $R^4$ represent, independently of each other, hydrogen, alkyl, aralkyl or aryl, or
$R^1$, $R^2$, $R^3$ and $R^4$ represent, independently of each other, members of a five- or six-membered ring produced by linkage with the o-position of the benzene ring or
$R^1$ and $R^2$ or $R^3$ and $R^4$ jointly represent members of a five- or six-membered ring,
B represents oxygen, sulphur or N—R,
R represents hydrogen, alkyl or aryl and
D represents CH, C—CN or N, in which the two benzene rings may be fused with a further benzene ring and then $NR^3R^4$ may also be replaced by hydrogen, and in which the cyclic and acyclic radicals and the benzene rings may be substituted by nonionic radicals usual in dyestuff chemistry.

9 Claims, No Drawings

FANAL PIGMENTS OF CLOSED-RING DRY TONERS CONTAINING INDAMINE-AND DIPHENYLMETHANE DYESTUFFS

The object of the invention is a dry toner for developing latent electrostatic images in electrostatic copying and printing processes which contains a pigment of the formula

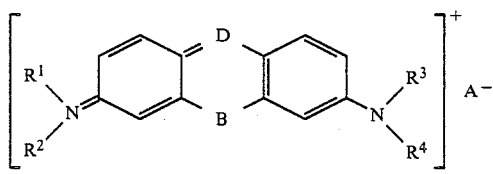

as charge-control substance, in which formula
$A^-$ represents a silicomolybdate anion,
$R^1$ and $R^3$ represent, independently of each other, hydrogen, alkyl or aralkyl,
$R^2$ and $R^4$ represent, independently of each other, hydrogen, alkyl, aralkyl or aryl, or
$R^1$, $R^2$, $R^3$ and $R^4$ represent, independently of each other, members of a five- or six-membered ring produced by linkage the o-position of the benzene ring, or
$R^1$ and $R^2$ or $R^3$ and $R^4$ jointly represent members of a five- or six-membered ring,
B represents oxygen, sulpur or N—R,
R represents hydrogen, alkyl or aryl and
D represents CH, C—CN or N,
in which the two benzene rings may be fused with a further benzene ring and then $NR^3R^4$ may also replace hydrogen, and in which the cyclic and acyclic radicals and the benzene rings may be substituted by nonionic radicals usual in dyestuff chemistry.

Examples of nonionic groups are halogen, hydroxyl, alkoxy, alkenyloxy, aryloxy, aralkoxy, cycloalkyloxy, heteryloxy, aryl, heteryl, alkylmercapto, arylmercapto, aralkylmercapto, alkylsulphonyl, arylsulphonyl, cyano, carbamoyl, alkoxycarbonyl, amino, which may be substituted by 1 or 2 alkyl, cycloalkyl, aryl or aralkyl groups, acylamino, alkylcarbonyloxy and arylcarbonyloxy and as substituents of the rings, in addition, alkyl, aryl, aralkyl, nitro, alkenyl or arylvinyl.

Alkyl represents $C_1$- to $C_{30}$-alkyl, in particular $C_1$- to $C_{12}$-alkyl.

The alkyl radicals and the alkyl radicals in alkoxy, alkylthio, alkylamino, alkanoylamino, alkylsulphonyl and alkoxycarbonyl groups may be branched and may be substituted, for example, by fluorine, chlorine, $C_1$- to $C_4$-alkoxy, cyano or $C_1$- to $C_4$-alkoxycarbonyl.

Aralkyl is, in particular, phenyl-$C_1$- to $C_4$-alkyl which may be substituted in the phenyl nucleus by halogen, $C_1$- to $C_4$-alkyl and/or $C_1$- to $C_4$-alkoxy, preferably benzyl.

Cycloalkyl is, in particular, cyclopentyl or cyclohexyl optionally substituted by methyl.

Alkenyl is, in particular, $C_2$- to $C_5$-alkenyl which may be monosubstituted by hydroxyl, $C_1$- to $C_4$-alkoxy, cyano, $C_1$-$C_4$-alkoxycarbonyl, chlorine or bromine. Preferred are vinyl and allyl.

Halogen is, in particular, fluorine, chlorine and bromine, preferably chlorine.

Aryl is, in particular, phenyl or naphthyl optionally substituted by one to three $C_1$- to $C_4$-alkyl, chlorine, bromine, cyano, $C_1$- to $C_4$-alkoxycarbonyl or $C_1$- to $C_4$-alkoxy groups.

Alkoxy is, in particular, $C_1$- to $C_{12}$-alkoxy optionally substituted by chlorine or $C_1$- to $C_4$-alkoxy.

Acyl is, in particular, $C_1$- to $C_4$-alkylcarbonyl and $C_1$- to $C_4$-alkoxycarbonyl, and aminocarboyl or aminosulphonyl optionally mono- or disubstituted by $C_1$- to $C_4$-alkyl, phenyl or benzyl.

Alkoxycarbonyl is, in particular, $C_1$- to $C_4$-alkoxycarbonyl optionally substituted by hydroxyl, halogen or cyano.

Heteryl is, in particular, pyridyl, pyrimidyl, pyrazinyl, triazinyl, indolyl, imidazolyl, oxazolyl, thiazolyl, triazolyl, thiadiazolyl or tetrazolyl, which may be benzo-fused, and also their partially hydrogenated or fully hydrogenated derivatives.

Preferred nonionic substituents of the rings are $C_1$- to $C_4$-alkyl, $C_1$- to $C_4$-alkoxy, cyano, nitro and halogen.

The substituents $R^1$ and $R^2$, or $R^3$ and $R^4$ may form, jointly with the nitrogen atom to which they are bound, for example, a piperidine, piperazine or morpholine ring optionally substituted by one to four $C_1$-$C_4$-alkyl groups.

A dihydrobenzoxazine, terahydroquinoline or indoline ring, which may be substituted by one to four $C_1$-$C_4$-alkyl groups, for example, are produced by linkage of the substituents $R^1$, $R^2$, $R^3$ or $R^4$ with the o-position of the benzene ring jointly with the nitrogen atom to which they are bound and with the benzene ring.

Of the pigments of the formula I, the pigments of the following formulae are preferred:

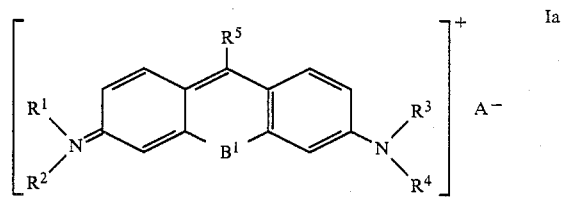

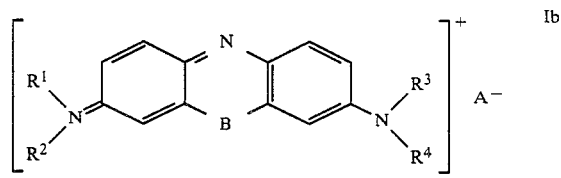

and

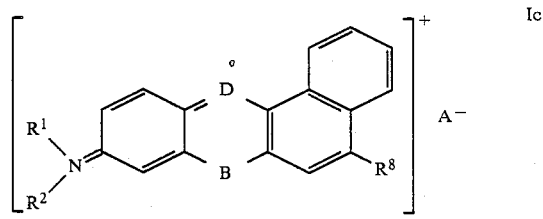

wherein
$B^1$ represents O or N—R,
$R^5$ represents H or CN and
$R^8$ represents hydrogen or the group

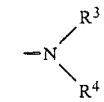

the other symbols have the meaning specified for formula I and the benzene rings and the naphthalene ring may be substituted.

A preferred group among the compounds specified above corresponds to the general formula

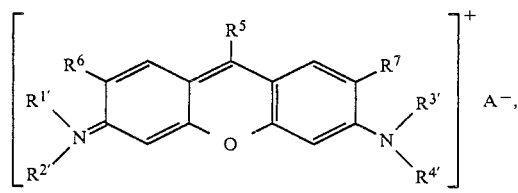

in which
R$^{1'}$ and R$^{3'}$ represent, independently of each other, hydrogen or a C$_1$- to C$_4$-alkyl radical optionally substituted by chlorine, cyano, hydroxyl, C$_1$- to C$_3$-alkylcarbonyloxy or C$_1$- to C$_4$-alkoxy or a benzyl radical,
R$^{2'}$ and R$^{4'}$ represent, independently of each other, the substituents specified for R$^{1'}$ and R$^{3'}$ or a phenyl radical optionally substituted by methyl, chlorine or C$_1$- to C$_4$-alkoxy,
R$^5$ represents hydrogen or cyano and
R$^6$ and R$^7$ represent, independently of each other, hydrogen methyl or C$_1$- to C$_4$-alkoxy, and
A$^-$ has the meaning specified above.

A further preferred group of pigments corresponds to the formula

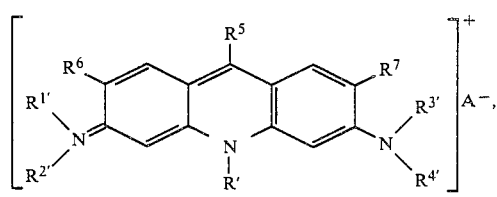

in which
R$'$ represents hydrogen, methyl, ethyl or a phenyl radical optionally substituted by methyl, chlorine or C$_1$- to C$_4$-alkoxy, and
R$^{1'}$, R$^{2'}$, R$^{3'}$, R$^{4'}$, R$^5$, R$^6$, R$^7$ and A$^-$ have the meaning specified above.

A further preferred group of compounds of the general formula I corresponds to the formula

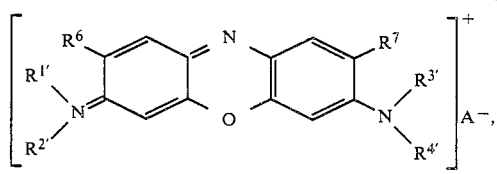

in which R$^{1'}$ to R$^{4'}$, R$^6$, R$^7$ and A$^-$ have the meaning specified above.

A further preferred group of compounds of the general formula I corresponds to the formula

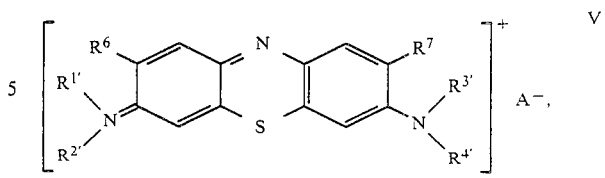

in which R$^{1'}$ to R$^{4'}$, R$^6$, R$^7$ and A$^-$ have the meaning specified above.

Finally, a further preferred group of compounds of the general formula I corresponds to the formula

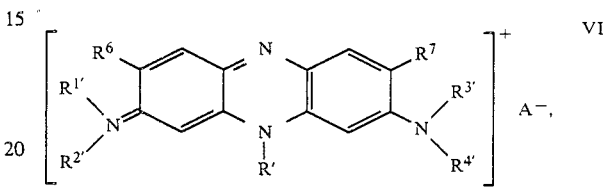

in which R$^{1'}$ to R$^{4'}$, R$^6$, R$^7$, R$'$ and A$^-$ have the meaning specified above.

Suitable as charge-control substance are furthermore pigments of the formula

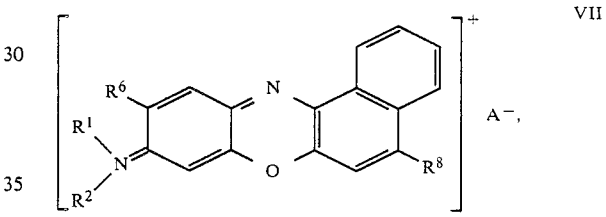

in which
R$^8$ represents hydrogen or the group

and
R$^1$, R$^2$, R$^3$, R$^4$, R$^6$ and A$^-$ have the meaning specified above.

Among these compounds, those compounds are in turn preferred in which the radicals A$^{1'}$ to R$^{4'}$ replace R$^1$ to R$^4$.

Among the substituents quoted in the formula II to VII, the following are of particular importance:
R$'$: hydrogen, methyl, ethyl, phenyl,
R$^{1'}$ to R$^{4'}$: hydrogen, methyl, ethyl,
R$^5$: hydrogen,
R$^6$ and R$^7$: hydrogen and methyl.

Dry toners used to develop latent electrostatic images in electrophotography or in electrostatic copying and printing processes are composed, in general, of binder resins, charge-control substances and pigments or soluble dyestuffs. Suitable as binder resins are, for example, styrene, epoxy, phenol, maleic acid and polyamide resins.

The styrene resins are, for example, styrene homopolymers or styrene copolymers with methacrylic acid esters, acrylic acid esters, chlorostyrene, α-methylstyrene, vinyl chloride or vinyl acetate.

Polycondensation resins are obtained from di- or polycarboxylic acids such as terephthalic acid, trimelitic acid, maleic acid, fumaric acid, polyhydroxy compounds such as 2,2-bis(hydroxyphenyl)propane.

The preferred weight ratio of pigment of the formula I to resin is 0.1–15, in particular 0.1–5, to 100 parts.

Benzidine yellow, phthalocyanine, quinacridone and perylenetetracarboxylic acid diimide pigments, for example, are suitable as colouring agents.

The preferred weight ratio of colouring agent to resin is 1–20 to 100 parts.

The dry toners according to the invention may be prepared, for example, by mixing the constituents in a kneader and then pulverizing them.

The toner obtained is mixed with a carrier, for example iron powder, which may also carry an envelope, or with glass beads to prepare a dry developer and under these circumstances exhibits a strongly positive charging capability with respect to the carrier.

Hitherto colour bases have been employed as charge-control substances in dry toners. Nigrosine colour bases exhibit the disadvantage that their charging properties vary between the individual production batches. Other colour bases produce an unstable charging if the temperature and humidity conditions vary.

The charge-control pigments according to the invention do not have these disadvantages and yield a stable charging which makes it possible to produce satisfactory copies even in a continuous test. They exhibit a wide multiplicity of colour shades so that they are suitable, in particular, for the preparation of coloured toners.

The charge-control substances are suitable also for the preparation of black toners if they are employed in combination with soot.

EXAMPLE 1

Preparation of a Sodium Silicomolybdate Solution 900 ml of water are heated to 30° C., 82.5 g of sodium molybdate dihydrate and 9.9 g of sodium metasilicate pentahydrate are added and the solution is stirred for 10 min at 30° C. Then 0.9 g of sdoium dichromate are added and the pH is adjusted to 2.5–2.6 by adding 64 ml of 32% hydrochloric acid dropwise. Stirring is continued for a further 15 min at 30° C., followed by dilution with water to 1,575 ml. The solution is heated to 50° C. and stirred for 10 min at 50° C.

Preparation of the Pigment 30 g of the cationic dyestuff of the formula

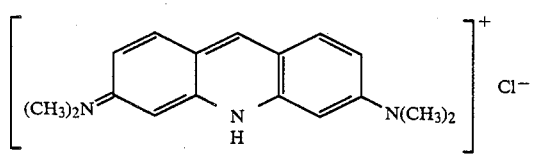

are dissolved in 1 l of water at 80° C. and 510 ml of a sodium silicomolybdate solution, whose preparation was described above, are added dropwise. Stirring is carried out for 10 min at 80° C., the suspension is allowed to cool, and the pigment is filtered off by suction, washed with water and dried in vacuo at 50° C.

Yield: 44.9 g.

Preparation of the Toner 100 g of styrene/n-butyl methacrylate copolymer (molecular weight: 50,000) and 5 g of the silicomolybdate pigment, whose preparation was described above, are homogeneously mixed in a kneader. After cooling, the resin is pulverized in a jet mill to a mean grain fineness of 12 μm. 5 g of this toner powder are charged up with 95 g of an iron carrier material with polymr coating by rotation and the charge is determined by the blow-off method. It is 8.6 μC/g and the level is still unchanged after 10,000 copiers.

If, instead of the above dyestuff, the dyestuffs of the formulae

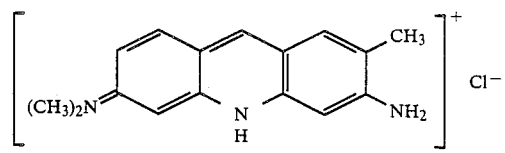

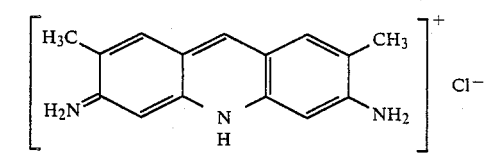

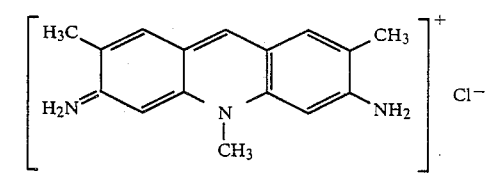

are used, toner powders with good triboelectric charging are likewise obtained.

EXAMPLE 2

30 g of the cationic dyestuff of the formula

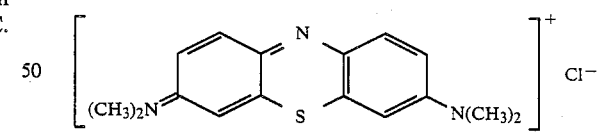

are dissolved in 1.5 l of water at 90° C. and 700 ml of the sodium silicomolybdate solution, whose preparation was described in Example 1, are added dropwise. The stirring is continued for 10 min at 90° C., the suspension is cooled, and the pigment is filtered off by suction, washed with water and dried in vacuo at 50° C.

Yield: 63.0 g.

The pigment is processed according to the specifications of Example 1 to produce a toner powder and the triboelectric charging is determined by the blow-off method. It is 7.7 μC/g.

If, instead of the above dyestuff, the dyestuffs of the formulae

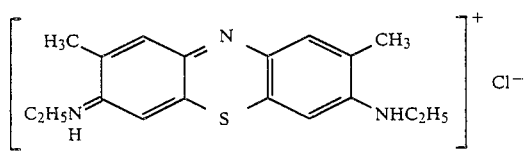

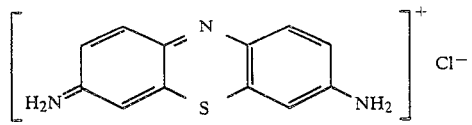

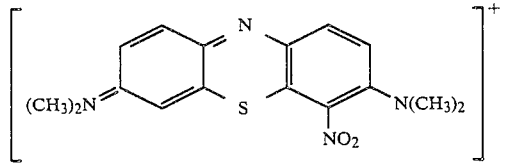

are used and the procedure is otherwise identical, toner powders with good triboelectric charging are likewise obtained.

EXAMPLE 3

30 g of the cationic dyestuff of the formula

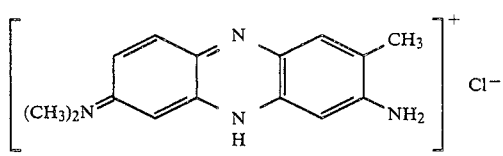

are dissolved in 1.5 l of water at 90° C., the solution is cooled to 75° C., 600 ml of sodium silicomolybdate solution, whose preparation was described in Example 1, are added dropwise, stirring is continued for 10 min at 75° C. and the suspension is cooled down. The pigment obtained is filtered off by suction, washed with water and dried in vacuo at 50° C.

Yield: 54.5 g.

The pigment is processed according to the specifications of Example 1 to produce a toner powder and the triboelectric charging is determined by the blow-off method. It is 6.1 μC/g.

If, instead of the above dyestuff, the dyestuffs of the formulae

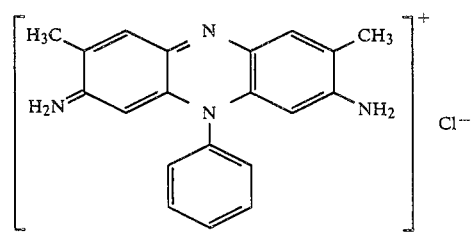

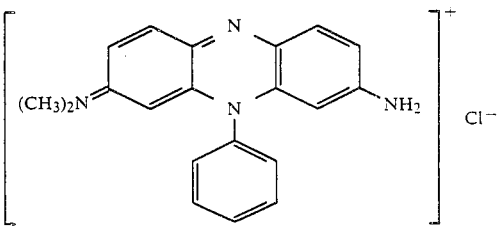

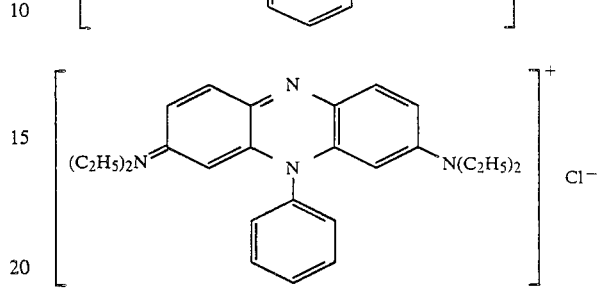

toner powders with good triboelectric charging are likewise obtained.

EXAMPLE 4

30 g of the cationic dyestuff of the formula

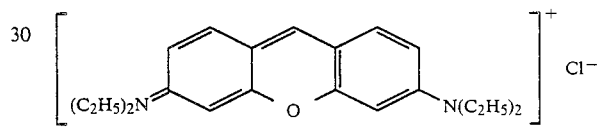

are dissolved in 1.5 l of water at 90° C. and 620 ml of a sodium silicomolybdate solution, whose preparation was described in Example 1, are added dropwise. The stirring is continued for 10 min at 90° C., the suspension is cooled down, and the pigment is filtered off by suction, washed with water and dried in vacuo at 50° C.

Yield: 52.5 g.

The pigment is processed according to the specifications of Example 1 to produce a toner powder and the triboelectric charging is determined by the blow-off method. It is 9.8 μC/g.

If, instead of the dyestuff of the formula given above, the dyestuff which carries methyl groups instead of the ethyl groups is used and the procedure is otherwise identical, a toner powder with likewise very good triboelectric charging is obtained.

EXAMPLE 5

25 g of the cationic dyestuff of the formula

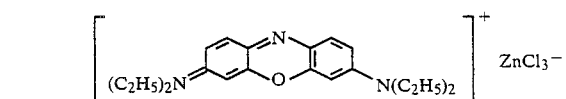

are dissolved in 1 l of water at 90° C. and 410 g of the solution of sodium silicomolybdate, whose preparation was described in Example 1, are added dropwise at 90° C. Stirring is allowed to continue for 10 in at 90° C., and the suspension is allowed to cool to 50° C., filtered off by suction and washed with water. After drying in vacuo at 50° C., 40.1 g of a blue pigment are obtained.

A blue toner powder is prepared according to the specifications of Example 1 and the triboelectric charging is determined by the blow-off method. It is 7.3 μC/g.

If, instead of the dyestuff of the above formula, a dyestuff which carries a methyl group in the o-position with respect to one of the diethylamino groups is used and the procedure is otherwise identical, a toner powder with very good triboelectric charging is likewise obtained.

Similarly good results are obtained with pigments consisting of the following dyestuffs:

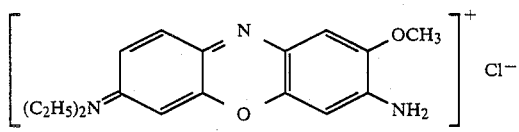

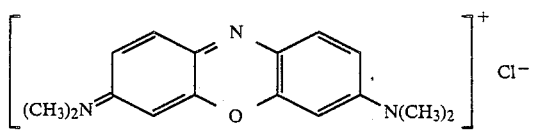

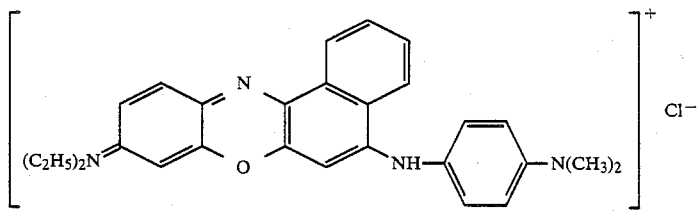

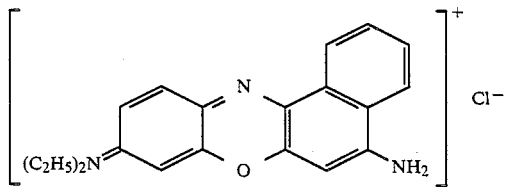

We claim:

1. A positively chargeable dry toner for electrostatic copying and printing processes comprising a binder resin and as a charge-control substance, a pigment of the formula

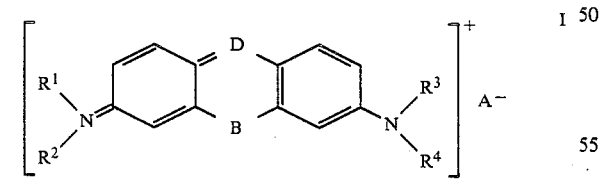

in which $A^-$ is a silicomolybdate anion, $R^1$ and $R^3$ are, independently of each other, hydrogen, alky or aralkyl, $R^2$ and $R^4$, are independently of each other, hydrogen, alkyl, aralkyl or aryl or $R^1$, $R^2$, $R^3$ and $R^4$ are, independently of each other, members of a five- or six-membered ring produced by linkage to the opposition of the benzene ring or $R^1$ and $R^2$ or $R^3$ and $R^4$ jointly are members of a five- or six-membered ring, B is oxygen, sulphur or N—R, R is hydrogen, alkyl or aryl and D is CH, C—CN or N, in which the two benzene rings may be fused with a further benzene ring and then hydrogen may also replace $NR^3R^4$, and in which the cyclic and acyclic radicals and the benzene rings are unsubstituted or substituted by nonionic radicals usual in dyestuff chemistry.

2. A positively chargeable dry toner according to claim 1, which contains, as a charge-control substance, a pigment of the formulae

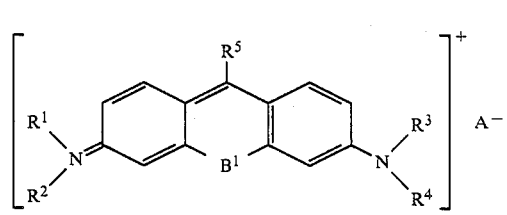

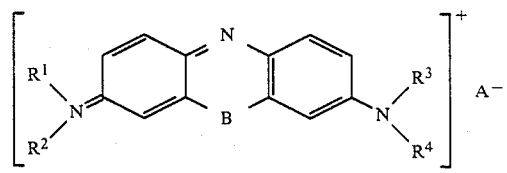

or

-continued

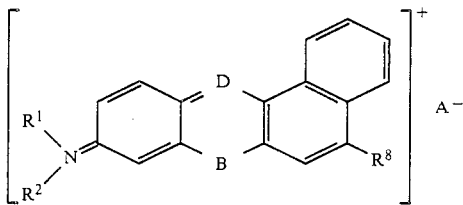

in which
B¹ is O or N—R,
R⁵ is H or CN and
R⁸ is hydrogen or the group

the other symbols have the meanings specified in claim 1 and the benzene rings and the naphthalene ring are unsubstituted or substituted by nonionic radicals usual in dyestuff chemistry.

3. A positively chargeable dry toner according to claim 1, which contains, as a charge-control substance, a pigment of the formula

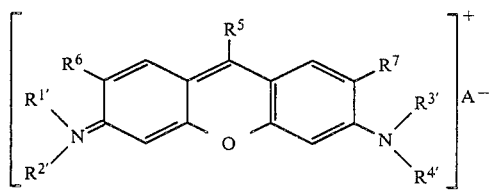

in which
$R^{1'}$ and $R^{3'}$ are, independently of each other, hydrogen or a $C_1$- to $C_4$-alkyl radical unsubstituted or substituted by chlorine, cyano, hydroxyl, $C_1$-$C_3$-alkylcarbonyloxy or $C_1$- to $C_4$-alkoxy, or a benzyl radical,
$R^{2'}$ and $R^{4'}$ are, independently of each other, the substituents specified for $R^{1'}$ and $R^{3'}$ or a phenyl radical unsubstituted or substituted by methyl, chlorine or $C_1$- to $C_4$-alkoxy,
$R^5$ represents hydrogen or cyano,
$R^6$ and $R^7$ are, independently of each other, hydrogen, methyl or $C_1$-$C_4$-alkoxy, and
$A^-$ is a silicomolybdate anion.

4. A positively chargeable dry toner according to claim 1, which contains, as a charge-control substance, a pigment of the formula

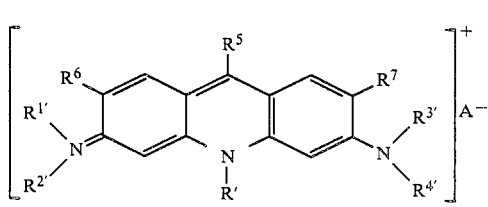

in which
$R^1$ is hydrogen, methyl, ethyl or a phenyl radical unsubstituted or substituted by methyl, chlorine or $C_1$- to $C_4$-alkoxy, $R^{1'}$ and $R^{3'}$ are, independently of each other, hydrogen or a $C_1$- to $C_4$-alkyl radical unsubstituted or substituted by chlorine, cyano, hydroxyl, $C_1$-$C_3$-alkylcarbonyloxy or $C_1$- to $C_4$-alkoxy, or a benzyl radical, $R^{2'}$ and $R^{4'}$ are, independently of each other, the substituents specified for $R^{1'}$ and $R^{3'}$ or a phenyl radical unsubstituted or substituted by methyl, chlorine or $C_1$- to $C_4$ alkoxy, $R^5$ represents hydrogen or cyano, $R^6$ and $R^7$ are, independently of each other, hydrogen, methyl or $C_1$-$C_4$-alkoxy, and $A^-$ is a silicomolybdate anion.

5. A positively chargeable dry toner according to claim 1, which contains, as a charge-control substance, a pigment of the formula

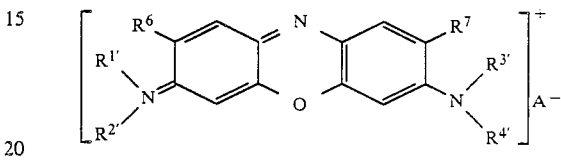

in which $R^{1'}$ and $R^{3'}$ are independently of each other, hydrogen or a $C_1$- to $C_4$-alkyl radical unsubstituted or substituted by chlorine, cyano, hydroxyl, $C_1$-$C_3$-alkylcarbonyloxy or $C_1$ to $C_4$-alkoxy, or a benzyl radical, $R^{2'}$ and $R^{4'}$ are, independently of each other, the substituents specified for $R^{1'}$ and $R^{3'}$ or a phenyl radical unsubstituted or substituted by methyl, chlorine or $C_1$- to $C_4$-alkoxy, $R^6$ and $R^7$ are, independently of each other, hydrogen, methyl or $C_1$- $C_4$-alkoxy, and $A^-$ is a silicomolybdate anion.

6. A positively chargeable dry toner according to claim 1, which contains, as a charge-control substance, a pigment of the formula

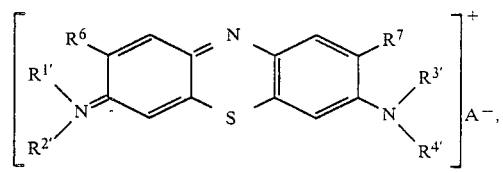

in which $R^{1'}$ and $R^{3'}$ are, independently of each other, hydrogen or a $C_1$- to $C_4$-alkyl radical unsubstituted or substituted by chlorine, cyano, hydroxyl, $C_1$-$C_3$-alkylcarbonyloxy or $C_1$- to $C_4$-alkoxy, or a benzyl radical, $R^{2'}$ and $R^{4'}$ are independently of each other, the substituent specified for $R^{1'}$ and $R^{3'}$ or a phenyl radical unsubstituted or substituted by methyl, chlorine or $C_1$- to $C_4$-alkoxy, $R^6$ and $R^7$ are, independently of each other, hydrogen, methyl or $C_1$-$C_4$-alkoxy, and $A^-$ is a silicomolybdate anion.

7. A positively chargeable dry toner according to claim 1, which contains, as a charge-control substance, a pigment of the formula

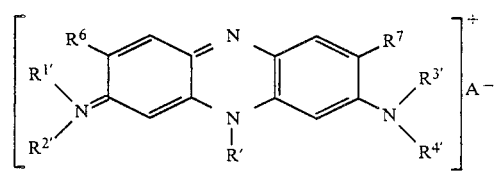

in which
$R'$ is hydrogen, methyl, ethyl or a phenyl radical unsubstituted or substituted by methyl, chlorine or $C_1$- to C$_4$-alkoxy R$^{1'}$ and R$^{3'}$ are, independently of each other, hydrogen or a C$_1$- to C$_4$-alkyl radical unsubstituted or substituted by chlorine, cyano, hydroxyl, C$_1$-C$_3$-alkylcarbonyloxy or C$_1$- to C$_4$-alkoxy, or a benzyl radical, R$^{2'}$ and R$^{4'}$, independently of each other, the substituents specified for R$^{1'}$ and R$^{3'}$ or a phenyl radical unsubstituted or substituted by methyl, chlorine or C$_1$- to C$_4$-alkoxy, R$^5$ represents hydrogen or cyano, R$^6$ and R$^7$ are, independently of each other, hydrogen, methyl or C$_1$-c$_4$-alkoxy, and A$^-$ is a silicomolybdate anion.

8. A positively chargeable dry toner according to claim 1, which contains, as a charge-control substance, a pigment of the formula

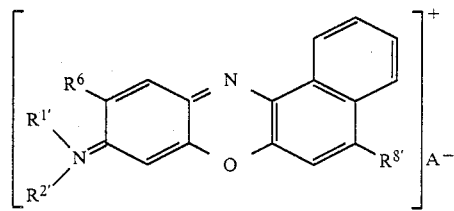

in which
R$^{8'}$ is for H or NR$^{3'}$R$^{4'}$ R$^{1'}$ and R$^{3'}$ are, independently of each other, hydrogen or a C$_1$- to C$_4$-alkyl radical unsubstituted or substituted by chlorine, cyano, hydroxyl, C$_1$-C$_3$-alkylcarbonyoxy or C$_1$- to C$_4$-alkoxy, or a benzyl radial, R$^{2'}$ and R$^{4'}$ are, independently of each other, the substituents specified for R$^{1'}$ and R$^{3'}$ or a phenyl radical unsubstituted or substituted by methyl, chlorine or C$_1$- to C$_4$-alkoxy, R$^6$ is hydrogen, methyl or C$_1$-C$_4$-alkoxy, and A$^-$ is a silicomolybdate anion.

9. A positively chargeable dry toner according to claim 3, in whose formulae
R$'$ is hydrogen, methyl, ethyl or phenyl,
R$^{1'}$ to R$^{4'}$ denote hydrogen, methyl or ethyl,
R$^5$ ;1 is hydrogen,
R$^6$ and R$^7$ are hydrogen or methyl and
R$^{8'}$ is hydrogen or NR$^{3'}$R$^{4'}$.

* * * * *

UNITED STATES PATENT AND TRADEMARK OFFICE
CERTIFICATE OF CORRECTION

PATENT NO. : 4,847,177

DATED : July 11, 1989

INVENTOR(S) : Raue et al.

It is certified that error appears in the above-identified patent and that said Letters Patent is hereby corrected as shown below:

Col. 2, line 27      Delete "terahydroquinoline" and substitute -- tetrahydroquinoline --

Col. 4, line 50      Delete " $A^{1'}$ " and substitute -- $R^{1'}$ --

Col. 5, line 44      Delete " sdoium " and substitute -- sodium --

Col. 11, line 20      After $R^4$ and before " the " add -- , --

Col. 14, line 27      After " $R^5$ " delete " ;1 "

Signed and Sealed this

Eighteenth Day of December, 1990

Attest:

HARRY F. MANBECK, JR.

*Attesting Officer*      *Commissioner of Patents and Trademarks*